(12) United States Patent
Matejcek

(10) Patent No.: US 6,544,677 B2
(45) Date of Patent: Apr. 8, 2003

(54) FUEL CELL SYSTEM

(75) Inventor: Lothar Matejcek, Mommenheim (DE)

(73) Assignee: General Motors Corporation, Detroit, MI (US)

( * ) Notice: Subject to any disclaimer, the term of this patent is extended or adjusted under 35 U.S.C. 154(b) by 240 days.

(21) Appl. No.: 09/758,766

(22) Filed: Jan. 11, 2001

(65) Prior Publication Data

US 2001/0028971 A1 Oct. 11, 2001

(30) Foreign Application Priority Data

Feb. 3, 2000 (DE) .......................... 100 04 800

(51) Int. Cl.⁷ .............................. H01M 8/18; H01M 8/04
(52) U.S. Cl. .............................. 429/20; 429/26; 429/24; 429/34; 429/38; 429/39; 429/19
(58) Field of Search ................ 429/26, 20, 19, 429/24, 34, 39, 38

(56) References Cited

FOREIGN PATENT DOCUMENTS

| DE | 19701560 | 7/1998 | | |
|---|---|---|---|---|
| DE | 19709560 A1 | * | 7/1998 | ............ H01M/8/04 |

* cited by examiner

Primary Examiner—Patrick Ryan
Assistant Examiner—Angela J Martin
(74) Attorney, Agent, or Firm—Cary W. Brooks

(57) ABSTRACT

A fuel cell system is described whose fuel cell is driven with a methanol-water mixture. The problem with such systems is that at the outlet from the cathode, as a result of the chemical reaction in the fuel cell, carbon dioxide is present which must be removed from the anode cycle. The previously known systems, however, have the disadvantage that water and methanol are also discharged simultaneously with the discharge of $CO_2$ in so-called vapor separators, and therefore are no longer available as energy carriers. Therefore, systems have already been proposed in which the liquid-vapor mixture is cooled before entering the vapor separator. In addition, combinations of several vapor separators are proposed. The present invention is related to this and proposes that the gas containing methanol emerging from a high temperature vapor separator be fed via a branch-stream cooler to the liquid accumulation of a low temperature vapor separator in a low temperature path. At this time the methanol there passes essentially over into the liquid phase.

13 Claims, 1 Drawing Sheet

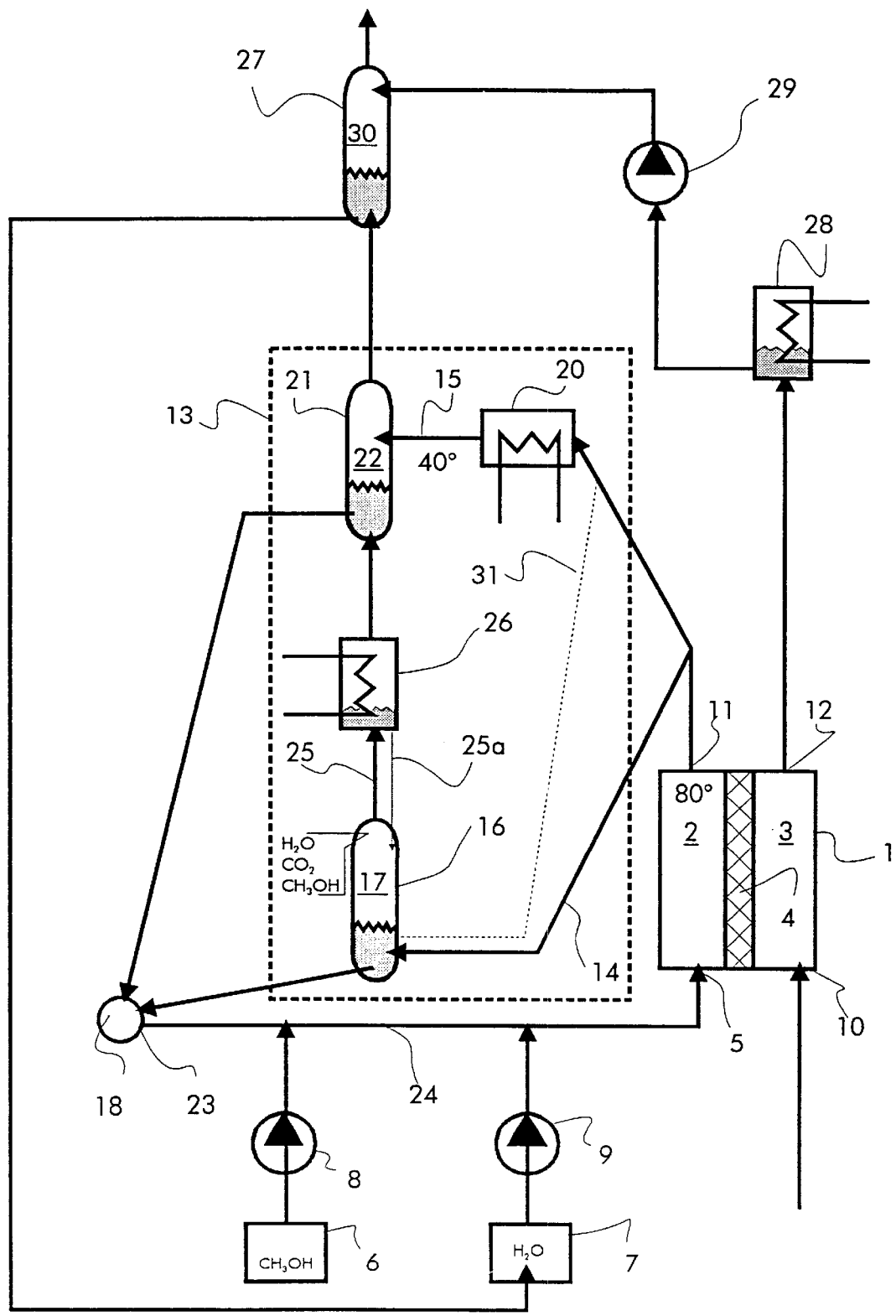

FUEL CELL SYSTEM

TECHNICAL FIELD

The invention concerns a fuel cell system with a fuel cell displaying an anode and a cathode, with a system for supplying a fuel-water mixture to the anode and a system for supplying an oxidant to the cathode as well as with a system for carrying off the liquid-vapor mixture occurring at the anode of the fuel cell, said removal system consisting of two parallel-running paths each with a vapor separator, with a mainstream cooler being connected in front of the vapor separator in the first path (low temperature path) so that the liquid-vapor mixture is cooled when fed to the vapor separator, and in which the second path (high temperature path) the liquid-vapor mixture is supplied essentially uncooled to the vapor separator and with a crossover path between the two paths through which the gas separated in the vapor separator in the high temperature path is fed cooled to the vapor separator in the low temperature path.

BACKGROUND OF THE INVENTION

Such a system is described in DE 197 01 560 A1: The central feature of the system is a fuel cell which is powered directly by methanol, i.e. the anode of the cell is supplied a mixture of methanol and water, with the methanol reacting chemically at the anode. At this time among others, carbon dioxide is formed. As the oxidizing agent, an oxygen-containing gas, preferably ambient air, is supplied to the cathode. The term "fuel cell" in this case refers not just to a single cell but rather to a system of several cells connected to each other, which is referred to by the technical term "stack".

The systems of this type encounter the following problem: the fuel cell is operated superstoichiometrically, i.e. only a small part of the methanol supplied to the anode reacts with water to form carbon dioxide. Therefore, a liquid-vapor mixture is present at the fuel cell outlet, with methanol, carbon dioxide and water being present in both the liquids as well as in the vapor phase. The unconsumed methanol and water contents are returned to the inlet of the anode in a circulation after the prior separation of the carbon dioxide. This takes place in so-called vapor separators, in which case, however, it must be assured that too much water and methanol are not discharged with the $Co_2$ in the form of gas.

It has been proposed that the liquid-vapor mixture be supplied in cooled form to the vapor separator so that the highly volatile methanol remains essentially in the liquid phase. However, it has been found that the problem of excessive methanol discharge cannot be satisfactory resolved in such a system

SUMMARY OF THE INVENTION

Therefore, in DE 197 01 560 A1 a system is proposed in which the return of the methanol takes place via two parallel-running paths in each of which a vapor separator is present. In a high temperature path a part of the liquid-vapor mixture which emerges from the fuel cell at a temperature of ca. 80–130° C. is fed to a first vapor separator (high temperature vapor separator).

The other part of the liquid-vapor mixture is fed, cooled, to a second vapor separator (low temperature vapor separator) at which time before cooling the still hot liquid-vapor mixture is mixed in this path with the vapor emerging from the high temperature separator. The mixing is accomplished in a metered way so that, according to the patent disclosure, the mass streams and with them, the temperature level can be selectively influenced so that variable control and regulating procedures are realizable (column 3, lines 46 ff.). The disadvantage here is that no optimal values can be achieved with respect to the methanol output so that water must be supplied in addition from the cathode circulation tot he low temperature vapor separator in order to be able to wash out the methanol still present in the vapor of the low temperature vapor separator.

To avoid this problem, the present invention proposes that a branch-stream cooler be provided in the crossover path so that the vapor emerging from the high temperature vapor separator is returned to the low temperature path cooled, and the condensate accumulating in the branch-stream cooler is returned to the high temperature vapor separator.

In particular, the crossover path should open into the low temperature vapor separator or into the liquid accumulation consisting essentially of methanol and water at the bottom of the vapor separator, i.e. below the liquid level formed by the liquid accumulation.

That part of the liquid-vapor mixture which goes into the high temperature path passes into the high temperature vapor separator. Carbon dioxide, gaseous water and gaseous methanol corresponding to the phase equilibrium are separated from the liquid at the bottom of the expansion chamber into the expansion chamber of the vapor separator which is located above the liquid level. This gas stream is cooled by the second branch-stream cooler. The methanol-containing liquid condenses out at this time is returned to the high temperature vapor separator. The emerging gas stream is brought into contact in the low temperature vapor separator with the cooled liquid accumulation at the bottom of the low temperature vapor separator. In this way a material exchange takes place in which the methanol and water vapor from the gas stream of the crossover path pass over into the cold liquid from the low temperature path. In this way the gaseous methanol can be brought back into the liquid phase and returned to the circulation. Depending on what the volume ratio between the two paths is, the effective methanol output can be kept very small.

In order to reduce it even further, it is recommended that another vapor separator or a scrubber be provided at the gas outlet of the low temperature vapor separator which is operated with water from the cathode cycle.

BRIEF DESCRIPTION OF THE DRAWINGS

The invention will be explained below in greater detail with reference to an example of embodiment represented by a block diagram.

DESCRIPTION OF THE PREFERRED EMBODIMENT

This diagram shows schematically a fuel cell 1 with an anode 2 and a cathode 3 which are separated from each other by an electrolyte, typically a proton conducting membrane 4.

A mixture of methanol and water is supplied to the inlet 5 of the anode. For this purpose, among others, a methanol tank 6 and a water tank 7 are available, which are each connected by a pump 8, 9 to the inlet 5. At the inlet 10 of the cathode 3, an oxygen-containing gas, especially ambient air, is available which is forced by a compressor (not shown) into the fuel cell. At the anode 2, the methanol reacts with the water to form $CO_2$. The protons generated by the reaction are transported via the membrane 4 to the cathode, the electrons are transported via an external circuit, now shown here, to a consumer of electricity, e.g. the drive motor of a vehicle. The operating temperature of such a fuel cell can be extremely variable. For the present case, a so-called polymer membrane fuel cell (PM-FC) is considered whose operating temperature is about 80–130° C. At the outlet 11 of the anode 2, therefore, a liquid-vapor mixture with this temperature is present, in which case, water, methanol and carbon dioxide are present in the liquid as well as in the vapor phase. At the outlet 12 from the cathode 3, besides the unconsumed oxygen, as a result of the reaction, water is also present at the cathode.

The liquid-vapor mixture at the outlet 11 from the anode 2 is sent to a $CO_2$ separator 13 which consists of several parts. The corresponding parts are summarized here by a block indicated by a broken line. The essential point is that the conduit system for returning the methanol consists of two paths 14 and 15, one path being designated as the high temperature path 14 and the other as the low temperature path 15. A vapor separator 16, 21 is present in both paths. A vapor separator consists essentially of a container in which the liquid phase and the vapor phase of the liquid-vapor mixture can be separated from each other since a thermodynamic equilibrium can form between the liquid at the bottom of the container and the vapor which is situated in the expansion chamber of the container above the liquid level.

The first conduit segment of the high temperature path 14 leads to a vapor separator 16 which will be referred to below as the high temperature vapor separator, since the liquid-vapor mixture is fed to it uncooled. The conduit leads into the liquid accumulation at the bottom of the expansion chamber 17 of the vapor separator 16, considerable quantities of gaseous water and methanol also being present because of the high temperature of ca. 80–130° C. in the gas phase which consists chiefly of carbon dioxide. The substances present in the liquid phase are fed through a second conduit segment to a mixer 18 as a liquid.

The low temperature path 15 leads in a first conduit segment from the anode 2 initially to a mainstream cooler 20 in which the mixture is cooled as low as possible, e.g., to circa 40° C., and from there to the expansion chamber 22 of a vapor separator which will be referred to below as the low temperature vapor separator 21, because the liquid-vapor mixture is fed to it cooled. As an alternative to a direct connection between the anode 2 and the mainstream cooler 20, a connection may also be provided between the vapor separator 16 in the high temperature path 14 and the mainstream cooler 20 in the low temperature path so that the latter is fed from the liquid in the bottom of this vapor separator. This connection is indicated by a broken line and is provided with reference number 31.

In the process variant I (connection 31 is not shown as a broken line), a partial stream is separated from the material stream emerging from the anode in front of the mainstream cooler 20 and the high temperature vapor separator 16. At this point the material stream is still a two-phase mixture and has the anode outlet temperature. The mainstream cooler 20 must therefore carry off a greater quantity of heat than in process variant II (branching off of the partial stream via the connection 31 shown as a broken line) and must be capable of handling the two-phase flow. The two-phase flow may be of advantage for heat transfer, because turbulence is generated by the gas bubbles and the heat transfer is thus improved.

By cooling in the mainstream cooler 20, the $CO_2$ present in the gas phase is redissolved in the liquid, because more $CO_2$ is dissolved in a liquid the colder the liquid is. This would not be a disadvantage since the liquid in the low temperature vapor separator 21 is saturated with $CO_2$ independently of the saturation of the liquid entering there.

In process variant II, the partial stream after the mainstream cooler 20 is fed to the low temperature vapor separator 21 which is undersaturated with respect to $CO_2$. The process variant II, however, has the advantage that the material stream 31 is disconnected after the $CO_2$ phase separation and, therefore, no difficult to handle two-phase flow is present.

The gaseous fractions from the low temperature separator 21 are either released to atmosphere or, as explained in more detail below, sent to another scrubber 27. The materials in the liquid phase are fed to the mixer 18 also through a conduit. In the mixer, therefore, a mixing temperature is established which is derived from the individual temperatures of the material flows fed in so that the methanol-water mixture which is present at the outlet 23 from the mixer can be adjusted to certain temperature and fed through a feed line 24 to the inlet 5 of the anode 2.

In order to recover the greater part of the gaseous water and methanol from the gas phase of the high temperature vapor separator 16, a branch-stream cooler 26 is present in a crossover path 25 between the expansion chamber 17 and the liquid accumulation in the low temperature vapor separator 21. The condensate (methanol and water) accumulating there drips back into the high temperature vapor separator via return line 25a. The gas phase from the branch-stream cooler 26 is also fed to the also cooled liquid accumulation in the low temperature vapor separator 21. As a result, in particular the methanol from the gas phase passes over into the liquid phase there and can be returned to the anode 2 of the fuel cell 1 and via the mixer 18.

At the outlet from the expansion chamber 22 of the low temperature vapor separator 21 in this case a gas mixture is present which is in phase equilibrium with the liquid accumulation in the vapor separator. It contains essentially carbon dioxide and only small parts of gaseous methanol and gaseous water, corresponding to the prevailing temperature and pressure conditions. It can be scrubbed out once more in a third stage, for which the already above mentioned scrubber 27 is provided, which is operated with the water from the cathode cycle.

For this purpose the outlet 12 of the cathode 3 is connected to another cooler 28 which simultaneously has the function of a condensate separator. The accumulating condensate is fed by a condensate pump 29 to the expansion chamber 30 of the scrubber 27. In the expansion chamber 30 the two material streams are intimately mixed so that a new phase equilibrium is adjusted, at which time additional methanol from the gas phase passes into the liquid phase and, together with the water, it is fed to the water tank 7 and made available by the water pump 9 to the anode 2 of the fuel cell 1. Sensors, not shown, monitor the methanol content in the water tank so that the admixture of methanol from the methanol tank 6 can take place to the desired degree by means of pump 8.

The advantage of the entire arrangement is the stepwise depletion of the methanol from the $CO_2$ exhaust gas stream. First the $CO_2$ exhaust gas stream is cooled separately from the high temperature vapor separator 16 and the methanol/water condensate is removed since it drips back into the high temperature gas separator. Following this, the cold exhaust gas stream from the branch-stream cooler 26 is brought into thermodynamic equilibrium with the cold anode mixture in the low temperature separator 21, which involves further depletion of the methanol contained in the exhaust gas. This effect is not present in the arrangement according to DE 197 01560 A1, because these two steps are not separated.

The next step is the scrubbing out of the exhaust gas stream with pure water in the scrubber 27 which again achieves a depletion effect. In the arrangement according to DE 197 01 560 A1, this is not a pure scrubbing step, because in addition tot he exhaust gas being scrubbed out, the condensate accumulating in the mainstream cooler is fed to the "scrubbing container" and liquid methanol is introduced with this condensate which reduces the scrubbing effect.

In the presently known direct-methanol fuel cells, it is necessary to use low methanol concentrations because of the crossover. As a result, the differences in design (present invention: methanol separation performed in separate separating stages; invention according to DE 197 01 560 A1: mixing of streams without prior sluicing out of the accumulating condensate) are not so strongly noticeable. Distinct differences are apparent, however, in the case of higher methanol concentrations because of the better membranes and in the case of a diminishing system pressure (from 3 bar to 1.5 bar). The present invention is characterized especially by the fact that the liquids (condensates) accumulating in the individual process steps are selectively separated out and fed to the mixer 18 before the gas phase is fed into the next treatment step. This comprises a difference from the invention according to DE 197 01 560 A1 in which such a separation does not take place, and therefore, the condensed-out liquid is disadvantageously carried along into the next treatment step.

What is claimed is:

1. A fuel cell system with a fuel cell displaying an anode and a cathode, with a system for supplying a fuel-water mixture to the anode and a system for supplying an oxidant to the cathode and also with a system for carrying off the liquid-vapor mixture emerging at the anode of the fuel cells, this removal system consisting of two parallel-running paths each with a vapor separator, a mainstream cooler being connected in front of the vapor separator in the first path (low temperature path) so that the liquid-vapor mixture is fed cooled to the vapor separator, while in the second path (high temperature path) the liquid-vapor mixture is fed essentially uncooled to the vapor separator, and also with a crossover path between the two paths by which the gas separated in the vapor separator in the high temperature path is fed cooled to the vapor separator in the low temperature path, characterized such that a branch-stream cooler is provided in the crossover path so that the vapor emerging from the high temperature vapor separator is fed cooled to the low temperature path and the condensate accumulating in the branch-stream cooler is returned to the high temperature vapor separator.

2. A fuel cell system as in claim 1 characterized such that the crossover path opens directly into the low temperature vapor separator.

3. A fuel cell system as in claim 2 characterized such that the crossover path opens into the liquid accumulation at the bottom of the low temperature vapor separator.

4. A fuel cell system as in claim 3, characterized such that the cooled liquid-vapor mixture of the low temperature path is introduced into an expansion chamber above the liquid level of the liquid accumulation at the bottom of the low temperature vapor separator.

5. A fuel cell system according to claim 1 characterized such that a liquid partial stream from the high temperature vapor separator is supplied through a conduit to the mainstream cooler.

6. A fuel cell system according to claim 1 characterized such that a scrubber is provided to which the gases emerging from the low temperature vapor separator are fed and which is driven with water which is branched off from the cathode cycle of the fuel cell.

7. A fuel cell system according to claim 2 characterized such that a liquid partial stream from the high temperature vapor separator is supplied through a conduit to the mainstream cooler.

8. A fuel cell system according to claim 3 characterized such that a liquid partial stream from the high temperature vapor separator is supplied through a conduit to the mainstream cooler.

9. A fuel cell system according to claim 4 characterized such that a liquid partial stream from the high temperature vapor separator is supplied through a conduit to the mainstream cooler.

10. A fuel cell system according to claim 2 characterized such that a scrubber is provided to which the gases emerging from the low temperature vapor separator are fed and which is driven with water which is branched off from the cathode cycle of the fuel cell.

11. A fuel cell system according to claim 3 characterized such that a scrubber is provided to which the gases emerging from the low temperature vapor separator are fed and which is driven with water which is branched off from the cathode cycle of the fuel cell.

12. A fuel cell system according to claim 4 characterized such that a scrubber is provided to which the gases emerging from the low temperature vapor separator are fed and which is driven with water which is branched off from the cathode cycle of the fuel cell.

13. A fuel cell system according to claim 5 characterized such that a scrubber is provided to which the gases emerging from the low temperature vapor separator are fed and which is driven with water which is branched off from the cathode cycle of the fuel cell.

* * * * *